(12) United States Patent
Peyton

(10) Patent No.: US 8,733,381 B2
(45) Date of Patent: May 27, 2014

(54) ANCHOR VALVE FOR SECURITY

(75) Inventor: Nicholaus J. Peyton, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 1155 days.

(21) Appl. No.: 12/144,273

(22) Filed: Jun. 23, 2008

(65) Prior Publication Data

US 2009/0000666 A1    Jan. 1, 2009

Related U.S. Application Data

(60) Provisional application No. 60/945,464, filed on Jun. 21, 2007.

(51) Int. Cl.
*E03B 9/02*        (2006.01)

(52) U.S. Cl.
USPC ............. 137/15.02; 137/15.17; 137/300; 137/614.2; 137/527.2; 137/527.8; 285/368

(58) Field of Classification Search
USPC ........ 137/299, 300, 527, 527.2, 527.8, 15.02, 137/15.17, 614.2; 285/368, 400, 412
See application file for complete search history.

(56) References Cited

U.S. PATENT DOCUMENTS

| | | | | |
|---|---|---|---|---|
| 291,773 A | * | 1/1884 | Reilly | 285/412 |
| 349,549 A | * | 9/1886 | West | 285/412 |
| 673,674 A | * | 5/1901 | Baker | 137/300 |
| 935,412 A | * | 9/1909 | Rust | 285/412 |
| 1,070,667 A | * | 8/1913 | Clark | 285/400 |
| 1,720,444 A | * | 7/1929 | Rowley | 137/527.8 |
| 1,960,472 A | * | 5/1934 | Balaam et al. | 285/412 |
| 2,629,448 A | * | 2/1953 | Duggan | 137/527.8 |
| 3,292,658 A | * | 12/1966 | Scaramucci | 137/527.2 |
| 4,191,205 A | | 3/1980 | Nash | |
| 4,227,544 A | * | 10/1980 | Luckenbill | 137/307 |
| 4,469,122 A | * | 9/1984 | Meek | 137/527.8 |
| 4,602,654 A | | 7/1986 | Stehling et al. | |
| 4,691,726 A | * | 9/1987 | Studer et al. | 137/15.17 |
| 5,159,953 A | * | 11/1992 | Sato et al. | 137/527.8 |
| 5,285,816 A | * | 2/1994 | Herlihy | 137/527.8 |
| 5,813,706 A | * | 9/1998 | Travis | 285/368 |
| 6,000,473 A | | 12/1999 | Reilly | |
| 6,019,398 A | | 2/2000 | Powers | |
| 6,227,234 B1 | | 5/2001 | Powers | |
| 6,247,489 B1 | | 6/2001 | Maskell et al. | |
| 6,360,771 B2 | | 3/2002 | Powers | |

(Continued)

FOREIGN PATENT DOCUMENTS

CA        2635547        3/2013

OTHER PUBLICATIONS

Menyhart, Steven A., Office Action for Application No. 2,635,547 from Canadian Intellectual Property Office, Dec. 23, 2010.

(Continued)

*Primary Examiner* — John Rivell
(74) *Attorney, Agent, or Firm* — Taylor English Duma LLP

(57) ABSTRACT

An anchor valve for security is disclosed. The anchor valve includes a check valve with a flapper for preventing a contaminant from entering the fluid supply system. Contaminants that are outboard of the anchor valve are unable to pass by and are expelled when the fluid supply valve is opened. The anchor valve may include an access cover for maintenance and inspection of the flapper and the check valve.

22 Claims, 5 Drawing Sheets

(56) References Cited

U.S. PATENT DOCUMENTS

| | | |
|---|---|---|
| 6,543,474 B2 | 4/2003 | Fetterman |
| 6,691,732 B2 | 2/2004 | Fluery et al. |
| 6,782,916 B2 * | 8/2004 | Svendsen et al. .......... 137/527.8 |
| 6,868,860 B2 | 3/2005 | Davidson |
| 6,886,586 B2 | 5/2005 | Fluery |
| 6,892,752 B2 * | 5/2005 | Burlock et al. ............... 137/317 |
| 7,004,511 B2 | 2/2006 | Barron et al. |
| 7,055,544 B2 | 6/2006 | Davidson |
| 7,104,572 B1 * | 9/2006 | Kane ............................ 285/199 |
| 7,128,091 B2 | 10/2006 | Istre |
| 7,174,911 B2 | 2/2007 | Davidson |
| 7,191,666 B2 | 3/2007 | Parris et al. |
| 7,490,868 B2 * | 2/2009 | Prestridge .................... 285/368 |
| 7,520,294 B2 * | 4/2009 | German et al. ............... 137/300 |
| 7,686,031 B2 * | 3/2010 | German et al. ............... 137/300 |
| 2005/0155645 A1 * | 7/2005 | Freudendahl ............. 137/68.14 |
| 2006/0016479 A1 * | 1/2006 | Gonzales ...................... 137/283 |
| 2007/0295406 A1 | 12/2007 | German et al. |
| 2008/0083458 A1 * | 4/2008 | Davidson et al. ............. 137/300 |
| 2010/0181767 A1 * | 7/2010 | Kozal ............................ 285/412 |

OTHER PUBLICATIONS

'Water, Sewer and Drain Fittings B-10: Ductile Iron Mechanical Joint Fittings', Edward J. Prescott, Inc., Jun. 2001.

Peyton, Nicholaus J.; Provisional Patent Application entitled: Anchor Valve for Security, filed Jun. 21, 2007, having U.S. Appl. No. 60/945,464, 20 pages.

Peyton, Nicholaus J.; Office Action for Application No. 2,635,547 From Canadian Intellectual Property Office, mailed Jun. 11, 2012; 2 pgs.

Peyton, Nicholaus J.; Office Action for Application No. 2,635,547 From Canadian Intellectual Property Office, mailed Sep. 8, 2011; 3 pgs.

* cited by examiner

ANCHOR VALVE FOR SECURITY

CROSS REFERENCE TO RELATED APPLICATION

This application claims benefit, under 35 U.S.C. §119(e), of U.S. Provisional Application Ser. No. 60/945,464, filed 21 Jun. 2007, the entire contents and substance of which are hereby incorporated by reference.

FIELD OF THE INVENTION

The present invention relates to an anchor valve for security purposes. More specifically, the present invention relates to an anchor check valve for securing a fluid system, such as those including fire hydrants, from contamination.

BACKGROUND OF THE INVENTION

Fire hydrants are usually connected to a municipal (drinking) water system for the purpose of extinguishing fires, and dispensing water for other purposes, such as construction or for human consumption and use during appropriate situations. However, existing fire hydrants are designed such that any individual can open a hydrant cap with simple tools and deposit contaminants or other hazardous materials into the hydrant. A contaminant may be a foreign, unnatural, or undesirable substance. A contaminant may also include an unnatural or undesirable amount of naturally occurring or desired substances. Replacing the hydrant cap seals the hydrant, and then opening the gate valve, again with simple tools, allows for water to mix with the contaminants and spread within the water supply.

A conventional fire hydrant is illustrated in FIG. 1. The fire hydrant 100 includes a barrel 105, which can include both an upper barrel 110 and a lower barrel 120. The fire hydrant 100 can be in communication with a hydrant shoe 130, which is preferably in fluid communication with a water supply 150.

The lower barrel 120, which is commonly referred to as a stand pipe, is connected to the hydrant shoe 130, which is commonly referred to as an elbow, at its lower end 107. The upper end 106 of the lower barrel 120 is connected to the upper barrel 110, which is commonly referred to as a hydrant barrel. The upper barrel 110 is preferably above-ground, making it accessible and easily discoverable for users. To be released from the hydrant, water can flow from the water supply through the hydrant shoe, the barrel, and then outwardly from a nozzle.

The upper barrel 110 includes a nozzle assembly 140, an operating mechanism 160, and a bonnet 170. The nozzle assembly 140 is adapted to allow water to flow out of the hydrant 100. The nozzle assembly 140 includes a nozzle outlet 142, which extends laterally from the upper barrel 110, and a nozzle cap 146. The nozzle outlet 142 can include a nozzle threading 144 and a nozzle opening 148. The nozzle cap 146 is removeable from the nozzle outlet 142 via the nozzle threading 144, enabling the nozzle cap 146 to be attached and removed from the nozzle outlet 142, as needed. If water rises through the upper barrel 110 of the hydrant 100, the water can escape the hydrant 100 via the nozzle opening 148, if the nozzle cap 146 is removed from the nozzle outlet 142.

The operating mechanism 160, which often comprises an operating nut 162, is rotatable, such that a valve assembly 180 can be adjusted to control water flow through the hydrant 100 from the water supply source 150. In many preferred embodiments, the operating nut 162 has a pentagon shape, which may be the same shape as a nut 147 of the nozzle cap 146. By having the same shape, a single tool can be used for both to remove the nozzle cap 146 from the nozzle outlet 142, and for rotating the operating nut 162 to control the valve assembly 180. Although, the pentagon-shape is considered "non-standard" and requires a special wrench, it may also be easily operated with different tools, such as a pipe wrench. This shape can also reduce unauthorized access to an inner cavity of the hydrant 100.

At the lower end of the lower barrel 120 is the valve assembly 180. The valve assembly 180 includes a valve seat 182, a hydrant valve 184, and upper plate 186 and lower plate 188. The valve assembly 180 is adapted to control the water flow through the hydrant 100, for example, to a fire hose connected to the nozzle outlet 142.

An operating stem 190 extends from the valve assembly 180 to the operating nut 162. The operating nut 162 controls the operating stem 190 to open/close the valve assembly 180, as desired or necessary. As the operating nut 162 is rotated, the hydrant valve 184 of the valve assembly 180 can be opened or closed, depending on the direction of the rotation.

As described, the lower end 107 of the lower barrel 120 is in communication with the valve assembly 180. The lower end 107 of the lower barrel 120 is also in communication with the hydrant shoe 130 via a flange 132. The hydrant shoe 130 is connected to the water supply 150.

Because of the sheer number of fire hydrants in service, it is not cost effective to replace all existing hydrants with another design. Rather, an anchor valve is needed that can be retrofitted to existing hydrants and that is also tamper-resistant itself. By locating the anchor valve underground, adjacent to the hydrant, the ability of an evildoer to quickly and stealthily attempt to introduce contaminants to the water supply is greatly reduced.

As it is not practical or possible to monitor every one of millions of fire hydrants currently in service, an anchor valve is needed that prevents contamination such as described above, yet is simple in operation, and once installed does not require maintenance or cause any complication when using the hydrant for its proper purposes. If an evildoer does open the hydrant cap after the anchor valve is installed, any contaminants will be contained within the hydrant and flushed out of the system once the valve is opened.

Fluid delivery systems also use hydrants or other valves to release fluids for various applications. For example, fuel is delivered in pipe systems and is accessed for usage at a number of release valves. In the case of an airport, fuel may be distributed under the runways and gate areas for easy dispensing to waiting aircraft, eliminating the need for mobile fuel trucks. It is desirable to prevent any contamination which may occur during a fueling operation from spreading into the main fuel supply system, thus another application of the present invention.

Fluids also need control and contamination prevention in appliances, for example. In the case of a dish or clothes washer, it is desirable to prevent contaminated or "grey" water from backing up into the water supply system. In the case of a lawn sprinkler system, preventing water backing up into the water supply system is also desirable, as sprinkler systems may come into contact with fertilizers and pesticides which are not fit for human consumption. These use of the anchor valve of the present invention to prevent such contamination is yet another use.

It is most desirable to locate the anchor valve of the present invention close to the dispensing point, for example, a hydrant, to minimize the volume of fluid possibly contaminated. However, the valve of the present invention may be located at any point in a fluid system, as required or determined by design constraints.

A number of devices are used for joining sections of pipe. For example, U.S. Pat. No. 7,004,511 discloses a coupling device with a sealing ring. U.S. Pat. No. discloses a bolt type coupling designed to provide clearance functions, so that gasket compression is achieved before the gripper ring effectively grips the pipe and locks the coupling in place when the bolt fasteners are tightened. U.S. Pat. No. 5,803,513 discloses the use of a plurality of skid pads strategically placed over the teeth of the gripping ring to prevent it from prematurely engaging the pipe before the compression of the accompanying gasket. U.S. Pat. No. 6,691,732 discloses a hydrant security device that is installed on top of a fire hydrant to prevent decontamination. However, none of these devices functions to join sections of pipe while incorporating an anchor check valve, which also protects the supply system from contamination.

The check valve is the heart of the anchor valve. A flapper valve is used in one embodiment which is durable yet uncomplicated, requiring no maintenance and is unaffected by cold, enabling the anchor valve to be buried underground. Traditionally, mechanical swing-type check valves have been used, but these check valves are complicated and prone to mechanical failure, which is undesirable especially in the case of a fire hydrant, whose principal use is in an emergency situation.

What is needed is an anchor valve that secures a fluid system from contamination with a check valve that does not impact operation but also is tamper-resistant and is easily retro-fitted to existing as well as new hydrants at time of installation.

SUMMARY OF THE INVENTION

The present invention overcomes the problems and disadvantages associated with current strategies and designs and provides new tools and methods of controlling adhesive migration and, in particular, migration in an assembly.

In accordance with an embodiment of the present invention, a check valve is provided for attachment between the supply line adjacent to the fluid source. A flapper valve is used within the valve housing, also including standard mechanical joint ends, such as flanges or screw fittings, for ease of connection to fluid supply system. For ease of installation, one joint end may swivel. This arrangement allows the anchor valve to restrain the fluid delivery system to a gate valve. Restraining the gate valve to the supply pipe prevents the gate valve; the anchor coupling and fluid delivery system will not be forcibly ejected from the main line by water pressure.

One embodiment of the present invention comprises an anchor valve for protecting a fluid supply from a contaminant. The anchor valve includes a section of pipe having an inlet end and exit end, and a backflow prevention assembly. The backflow prevention assembly includes a flapper in communication with a sealing surface. The fluid can flow through the section of pipe from the inlet end to the exit end but is prevented from flowing through the section of pipe from the exit end to the inlet end. Additionally, the anchor valve is adapted to be coupled to piping within a fluid delivery system.

The flapper is may be constructed of water-impervious materials, rubber, synthetic materials, or combinations thereof. The flapper may also be reinforced with a strengthening member. The anchor valve may further include an access cover, which may be secured to the section of pipe by at least one fastener.

The fluid delivery system may be a fire hydrant, where the anchor valve may be coupled to the hydrant shoe. The fluid delivery system may further be a sprinkler system or a fuel distribution system or combinations thereof.

The anchor valve may have at least one end that swivels. Furthermore, the flapper may pivot away from the sealing surface as the fluid flows through the section of pipe from the inlet end to the exit end. The anchor valve may be coupled to piping within another fluid delivery system.

Another embodiment comprises a method of installing an anchor valve on an existing fluid delivery system. The method includes the steps of removing a section of pipe from the existing fluid delivery system, replacing the section of pipe with the anchor valve of the present invention, and securing the anchor valve of claim one to the remaining piping.

Another embodiment comprises a method of preventing a contaminant from entering a fluid source. The method includes the steps of drawing a desired amount of fluid from the fluid source through a series of pipes, including an anchor valve, maintaining a portion of the fluid on the exit side of the anchor valve after the desired amount of fluid is withdrawn from the fluid source, preventing the remaining portion of fluid from reentering the fluid source via the anchor valve, thereby preventing a contaminant from entering the fluid source, and expelling the remaining portion of fluid and contaminant from the series of pipes upon the next withdrawal of fluid from the fluid source.

The series of pipes may be part of a sprinkler system, a fire hydrant, fuel distribution system, or combinations thereof. The fluid may be maintained on the exit side of the anchor valve by a check valve that includes a flapper and a sealing surface.

Other embodiments and advantages of the invention are set forth in part in the description, which follows, and in part, may be obvious from this description, or may be learned from the practice of the invention.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is preventing contamination of fluid supplies. It was surprisingly discovered that a check valve that is incorporated into the piping of a fluid supply is capable of preventing contaminants from entering the fluid supply. By preventing the back flow of fluid into the fluid supply, a check valve is able to keep the fluid supply free of contamination.

Figure 1:
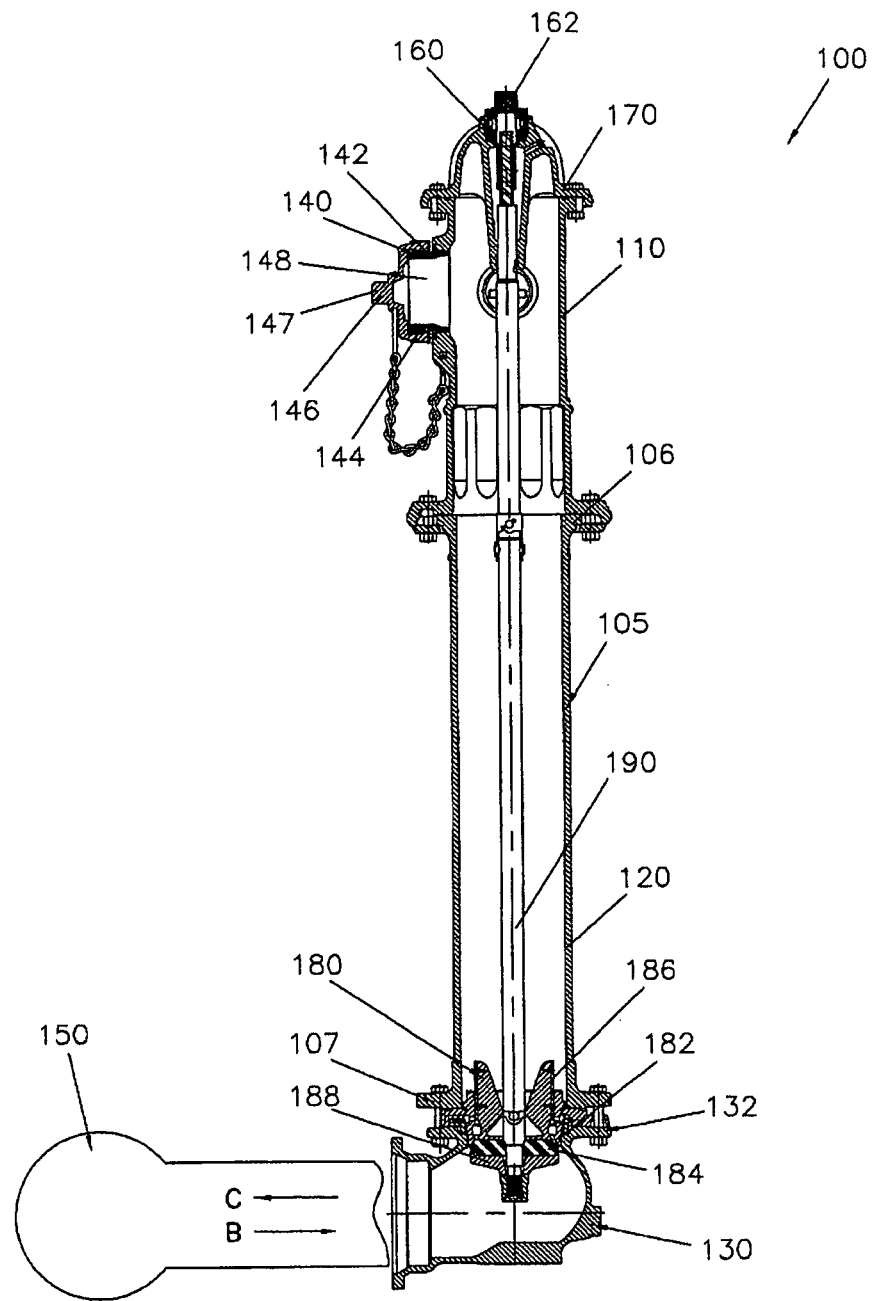
FIG. 1 shows a traditional fire hydrant.
Figure 2:
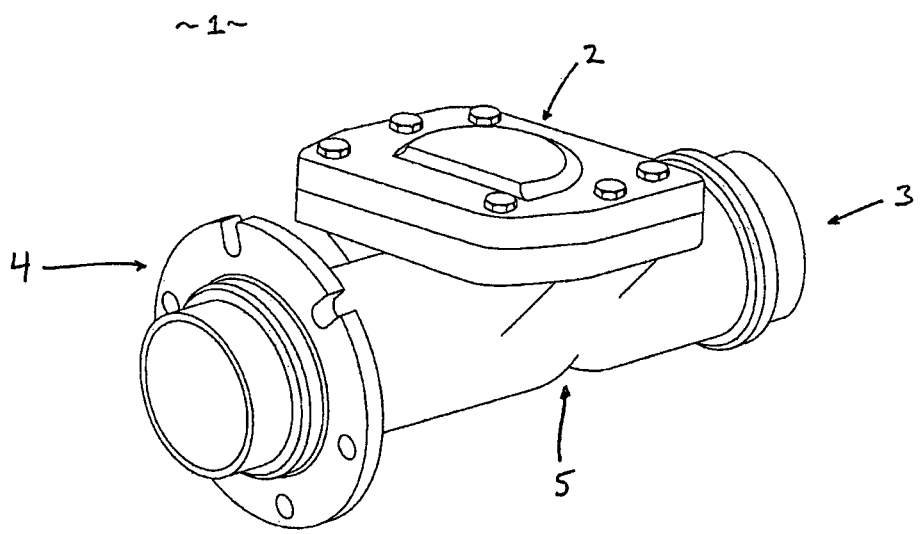
FIG. 2 is a projection view of one embodiment of the present invention.
Figure 3:
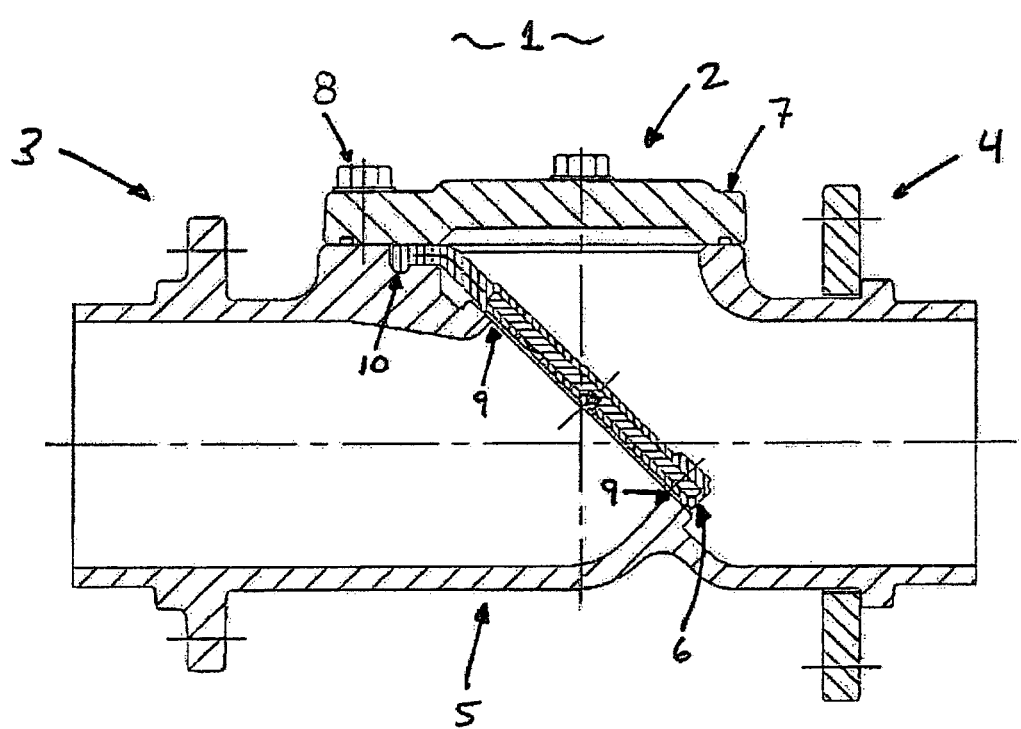
FIG. 3 is a cross sectional view of one embodiment of the present invention.

FIG. 2 illustrates anchor valve 1. Check valve 2 is shown situated about the middle of the section of pipe 5, with inlet end 3 and exit end 4 located at opposite ends of pipe 5. Pipe 5 can be of any length. In certain embodiments, inlet end 3 may be adapted to be coupled to a hydrant shoe in other embodiments, exit end 4 may be adapted to be coupled to a hydrant shoe. Inlet end 3 and exit end 4 may be secured to a hydrant shoe or any other piping by any means known in the art, including but not limited to bolts via flanges, screw fittings, clips, welding, and adhesive. Within check valve 2 is flapper 6 which is fixedly attached to the interior of check valve 2 and operates by forcibly closing when fluid pressure reaches a minimum threshold amount, thereby preventing a contaminant from being introduced into the fluid supply system. FIG. 3 shows also the anchor check valve may include a first mechanical joint arranged at the inlet end of the anchor check valve and a second mechanical joint arranged at the exit end of the anchor check valve. Also, the first mechanical joint may include at least a first non-threaded male portion extending within an inner portion of a pipe of a fluid supply, a first shoulder portion having an outermost diameter greater than an outermost diameter of the first non-threaded male portion, and a first flange portion. The first shoulder portion may be disposed between the first flange portion and the first non-threaded male portion. The second mechanical joint may include at least a second non-threaded male portion extending within an inner portion of the hydrant shoe, a second shoulder portion having an outermost diameter greater than an outermost diameter of the second non-threaded male portion, and a second flange portion, the shoulder portion being disposed between the second flange portion and the second non-threaded male portion. The second flange portion of the second mechanical joint may be rotatable around a portion of the exit end and may be configured to prevent the second flange portion from being removed from the exit end.

FIG. 3 illustrates a cross sectional view of anchor valve 1. Anchor valve 1 is defined by a hollow cavity within pipe 5, which enables media to flow from a fluid source to an exit of the system. Check valve 2 is located along pipe 5 within the hollow cavity. At one end of pipe 5 is inlet end 3, at the opposite end of pipe 5 is exit end 4. Anchor valve 1 may include an access cover 7 enabling access into the cavity of anchor valve 1. Cover 7 may be secured to pipe 5 with a plurality of fasteners 8, but is easily removable for inspection or maintenance. While cover 7 is shown secured to pipe 5 by 6 fasteners, any number of fasteners may be used. Flapper 6 is fixedly attached to pipe 5 at securing point 10 and sealably engages pipe 5 at sealing surfaces 9, as shown in the cross-sectional view of FIG. 3, but is understood to include the entire inner circumference of pipe 5 at check valve 2. Flapper 6 may be reinforced by, preferably, a metal disc 406, encapsulated in a casing/covering 408, preferably made of rubber, to withstand a high differential pressure across flapper 6. Flapper 6 may be designed in such a way that in absence of pressure on either side of flapper 6, flapper 6 lies on sealing surfaces 9.

Water or other fluid, as supplied by the fluid supply system which is connected to anchor valve 1, flows through inlet end 3 when the fluid is drawn through. Flapper 6 pivots open due to the force of the water overcoming the resistive force of flapper 6. Water flows through anchor valve unhindered and exits at exit end 4. As water pressure decreases, flapper 6 closes as the force of the water being drawn through anchor valve 1 decreases to below the level necessary to overcome flapper 6's closure force. Some water is trapped within the piping, between the exit point and the flapper 6, which forces flapper 6 to stay in the closed position, pressed against sealing surfaces 9. If a contaminant is added at this point, the remaining trapped water will be affected, but the contaminant will be unable to enter the supply system. When the hydrant or fluid valve is next activated, the pressure of supply water will again overcome the resistive force of flapper 6 and push the remaining existing water (with the contaminant) out of the system through the exit, but no back-flow of contaminated water will occur, thus preserving the integrity of the water supply.

Figure 4:
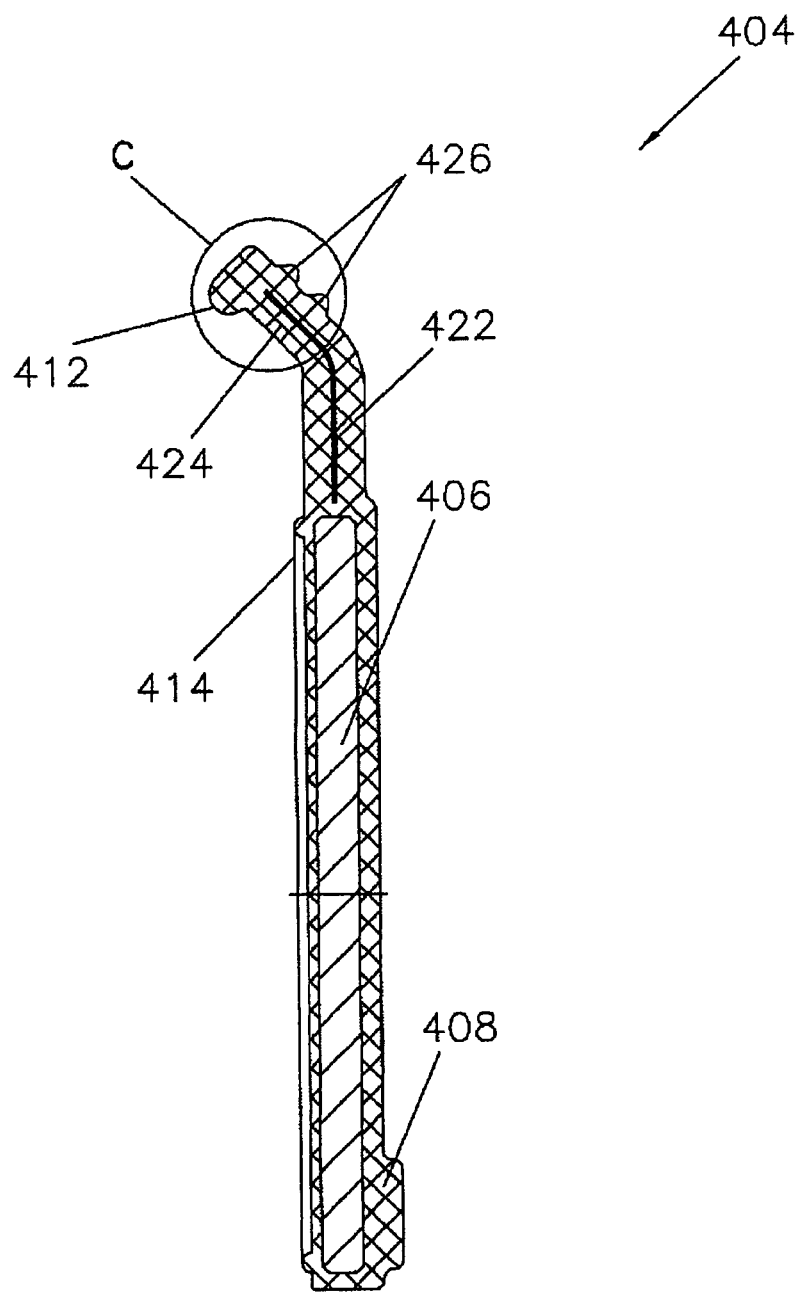
FIG. 4 is a cross section view of a flapper of the present invention.

FIG. 4 illustrates a cross-sectional view of a flapper 404 (e.g., the flapper 6). Flapper 404 can include a positioning lip 412, locking lips 426, a sealing surface 414, disc reinforcement 422, and the casing/covering 408 encapsulating the metal disc 406.

Figure 5:
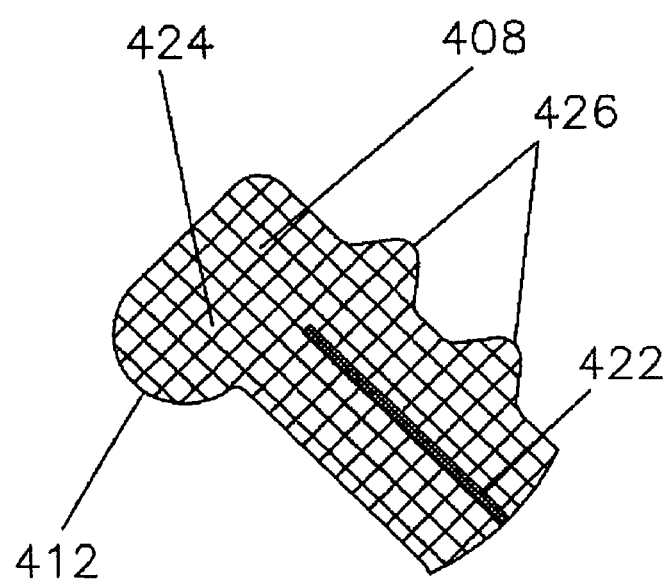
FIG. 5 is a close up view of portion "C" of the flapper of FIG. 4.

FIG. 5 illustrates a close-up of a disc short arm 424 of flapper 404 along with the locking lips 426 and positioning lip 412 for securing the disc short arm 424 of the flapper 404 in place. FIG. 5 also illustrates the disc reinforcement 422 for reinforcing flapper 404.

Although several embodiments are specifically illustrated herein, it will be appreciated that modifications and variations of the present invention are covered by the above teachings and are within the purview of the appended claims without departing from the spirit and intended scope of the invention. While the embodiment herein are directed toward fire hydrants the invention can be used in any type of fluid deliver system, including but not limited to sprinkler systems and fuel distribution systems. Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of."

What is claimed is:

1. A system for protecting a fluid supply from a contaminant, the system comprising:
    an anchor check valve having an inlet end and an exit end, the anchor check valve including a flapper in communication with a sealing surface, wherein fluid can flow through the anchor check valve from the inlet end to the exit end but is prevented from flowing through the anchor check valve from the exit end to the inlet end;
    a dry-barrel fire hydrant in proximate fluid communication with the anchor check valve, the dry-barrel fire hydrant having a valve operating mechanism; and
    a hydrant shoe coupled to the anchor check valve, the hydrant shoe having a valve assembly adjustably connected to the valve operating mechanism of the dry-barrel fire hydrant;
    wherein the anchor check valve includes a first mechanical joint arranged at the inlet end of the anchor check valve and a second mechanical joint arranged at the exit end of the anchor check valve;
    wherein the first mechanical joint includes at least a first non-threaded male portion extending within an inner portion of a pipe of a fluid supply, a first shoulder portion having an outermost diameter greater than an outermost diameter of the first non-threaded male portion, and a first flange portion, the first shoulder portion being disposed between the first flange portion and the first non-threaded male portion; and wherein the second mechanical joint includes at least a second non-threaded male portion extending within an inner portion of the hydrant shoe, a second shoulder portion having an outermost diameter greater than an outermost diameter of the second non-threaded male portion, and a second flange portion, the shoulder portion being disposed between the second flange portion and the second non-threaded male portion.

2. The system of claim 1, wherein the flapper is constructed of water-impervious materials.

3. The system of claim 1, wherein the flapper is constructed of rubber.

4. The system of claim 1, wherein the flapper is constructed of synthetic materials.

5. The system of claim 1, wherein the flapper is reinforced with a strengthening member.

6. The system of claim 1, wherein the anchor check valve includes an access cover.

7. The system of claim 6, wherein the access cover is secured to the anchor check valve by at least one fastener.

8. The system of claim 1, wherein the flapper pivots away from the sealing surface as the fluid flows through the section of pipe from the inlet end to the exit end.

9. The system of claim 1, wherein the valve operating mechanism is rotatable.

10. The system of claim 1, wherein the valve assembly of the hydrant shoe includes a valve seat, a hydrant valve, an upper plate, and a lower plate.

11. The system of claim 1, wherein the valve assembly is connected to the valve operating mechanism by an operating stem.

12. The system of claim 1, wherein the second flange portion of the second mechanical joint is rotatable around a portion of the exit end.

13. The system of claim 12, wherein the second shoulder portion of the second mechanical joint is configured to prevent the second flange portion from being removed from the exit end.

14. A method of installing an anchor check valve on a dry-barrel fire hydrant, comprising the steps of:
    removing a section of pipe connected between a fluid supply and a hydrant shoe of a dry-barrel fire hydrant, the hydrant shoe having a valve assembly;
    replacing the section of pipe with an anchor check valve, the anchor check valve including an inlet end, an exit end, and a flapper in communication with a sealing surface, the anchor check valve including a first mechanical joint arranged at the inlet end and a second mechanical joint arranged at the exit end; and
    securing the anchor check valve to a remaining piping;
    wherein the first mechanical joint includes at least a first non-threaded male portion extending within an inner portion of a remaining section of piping of the fluid supply, a first shoulder portion having an outermost diameter greater than an outermost diameter of the first non-threaded male portion, and a first flange portion, the first shoulder portion being disposed between the first flange portion and the first non-threaded male portion; and
    wherein the second mechanical joint includes at least a second non-threaded male portion extending within an inner portion of the hydrant shoe, a second shoulder portion having an outermost diameter greater than an outermost diameter of the second non-threaded male portion, and a second flange portion, the second shoulder portion being disposed between the second flange portion and the second non-threaded male portion.

15. The method of claim 14, further comprising the step of closing a gate valve coupled to the remaining section of piping.

16. The method of claim 14, wherein the second flange portion of the second mechanical joint is rotatable around a portion of the exit end.

17. The method of claim 16, wherein the second flange portion of the second mechanical joint is configured to prevent the second flange portion from being removed from the exit end.

18. A method of preventing a contaminant from entering a fluid source via a dry-barrel fire hydrant, comprising the steps of:
    drawing a desired amount of fluid from the fluid source through a dry-barrel fire hydrant system including a hydrant shoe and an anchor check valve having an inlet end, an exit end, and a flapper in communication with a sealing surface, the anchor check valve coupled to the hydrant shoe and including a first mechanical joint arranged at the inlet end and a second mechanical joint arranged at the exit end,
        the first mechanical joint having at least a first non-threaded male portion extending within an inner portion of the fluid source, a first shoulder portion having an outermost diameter greater than an outermost diameter of the first non-threaded male portion, and a first flange portion, the first shoulder portion being disposed between the first flange portion and the first non-threaded male portion,
        the second mechanical joint having at least a second non-threaded male portion extending within an inner portion of the hydrant shoe, a second shoulder portion having an outermost diameter greater than an outermost diameter of the second non-threaded male portion, and a second flange portion, the second shoulder portion being disposed between the second flange portion and the second non-threaded male portion, and the hydrant shoe having a valve assembly;
    maintaining a remaining portion of the fluid on an exit side of the anchor check valve after the desired amount of fluid is withdrawn from the fluid source;
    preventing the remaining portion of fluid from reentering the fluid source via the anchor check valve, thereby preventing a contaminant from entering the fluid source; and
    expelling the remaining portion of fluid and contaminant from the fire hydrant system upon a further withdrawal of fluid from the fluid source.

19. The method of claim 18, wherein the fluid is maintained on the exit side of the anchor check valve by the flapper and the sealing surface.

20. The method of claim 18, further comprising the step of opening a hydrant valve in the valve assembly of the hydrant shoe.

21. The method of claim 18, wherein the second flange portion of the second mechanical joint is rotatable around a portion of the exit end.

22. The method of claim 21, wherein the second flange portion of the second mechanical joint is configured to prevent the second flange portion from being removed from the exit end.

* * * * *